United States Patent [19]

Niida et al.

[11] Patent Number: 5,402,521
[45] Date of Patent: Mar. 28, 1995

[54] METHOD FOR RECOGNITION OF ABNORMAL CONDITIONS USING NEURAL NETWORKS

[75] Inventors: Kazuo Niida, Yokohama; Ichirou Koshijima, Zushi; Jun Tani, Kawasaki; Toshikazu Hirobe, Tokyo, all of Japan

[73] Assignee: Chiyoda Corporation, Yokohama, Japan

[21] Appl. No.: 885,696

[22] Filed: May 19, 1992

Related U.S. Application Data

[63] Continuation-in-part of Ser. No. 652,817, Feb. 18, 1991, abandoned.

[30] Foreign Application Priority Data

Feb. 28, 1990 [JP] Japan .................................. 2-48129

[51] Int. Cl.$^6$ ............................................. G06F 15/18
[52] U.S. Cl. ..................................... 395/22; 395/906; 395/914; 395/23; 364/150; 364/550
[58] Field of Search .................. 395/22, 21, 906, 914, 395/23; 364/550, 150, 184

[56] References Cited

U.S. PATENT DOCUMENTS

| | | | |
|---|---|---|---|
| 4,213,175 | 7/1980 | Kurihara | 364/119 |
| 4,214,301 | 8/1980 | Kurihara et al. | |
| 4,374,423 | 2/1983 | Kundles et al. | 364/434 |
| 4,509,110 | 4/1985 | Levesque, Jr. et al. | 364/153 |
| 4,630,189 | 12/1986 | Ohmori et al. | 364/150 |
| 4,773,028 | 6/1988 | Tallman et al. | |
| 4,979,126 | 12/1990 | Pao et al. | 364/513 |
| 5,023,045 | 6/1991 | Watanabe et al. | 376/215 |
| 5,052,043 | 9/1991 | Gaborski | 382/14 |
| 5,070,468 | 12/1991 | Niinomi et al. | 364/550 |
| 5,140,523 | 8/1992 | Frankel et al. | 364/420 |

FOREIGN PATENT DOCUMENTS

| | | |
|---|---|---|
| 1-210840 | 6/1989 | Japan . |
| 2-259006 | 3/1990 | Japan . |

OTHER PUBLICATIONS

Lippmann, R. P., "An Introduction to Computing with Neural Nets", IEEE ASSP Magazine, Apr. 1987, 4–20.
Sobajic et al., "On-line Monitoring and Diagnosis of Power System Operating Conditions Using Artificial Neural Networks", 1989 IEEE Intl. Symp. on Circuits and Systems, May 1989, 2243–2246.
Bhat et al., "Use of Neural Nets for Dynamic Modeling and Control of Chemical Process Systems," 1989 American Control Conference, Jun. 1989, 1342–1347.

(List continued on next page.)

*Primary Examiner*—Robert W. Downs
*Attorney, Agent, or Firm*—Nikaido, Marmelstein, Murray & Oram

[57] ABSTRACT

According to the present invention, a method for recognition of normal and abnormal conditions can be performed with at least one neural network. First, trend data of an object system, before a recognition-step, are entered as input data to an input layer of each neural network and data of this system at the recognition-step are entered as objective output data to an output layer of the neural network. Thus, multiple sets of trend data showing at least one normal condition of this system are formed in the neural network in order to obtained learned weights and biases. Next, output data at every recognition-step are predicted by entering actual trend data as input data to the neural network, while the learned weights and biases are utilized. Then, the predicted output data are compared with actual output data at every recognition-step. Finally, the normal and abnormal conditions of this system can be recognized by real time interpretation of deviations between the predicted output data and the actual output data. The method of the present invention particularly can be applied to a control system requiring the recognition of abnormal conditions such as a control system for the operation of a plant, an automobile, a robot, an aircraft, a marine vessel, a medical apparatus, security apparatus and the like.

12 Claims, 9 Drawing Sheets

OTHER PUBLICATIONS

Narendra et al., "Identification and Control of Dynamical Systems Using Neural Networks," IEEE Trans. on Neural Networks, Mar. 1990, 4–27.

Explorations in Parallel Distributed Processing, A Handbook of Models, Programs and Excercises, James L. McClelland et al., 1988.

A Multilayered Neural Network Controller, Demetri Psailtis, et al., 1988.

Neural Network Models for the Learning Control of Dynamical System With Application to Robotics, Pourboghrat et al., 1989.

Skeletonization: A Technique for Trimming the Fat From a Network Via Relevance Assessment by Michael C. Mozer, 1989.

Neural Network Approach to Fault Detection Under Unsteady State Operation by Ichiro Koshijima, Apr. 1992.

$$f(x) = \frac{1}{1+\exp(-x)}$$

(SIGMOID FUNCTION)

FIG. 5

TIME

TIME-SERIES PATTERN OF LEARNED DATA

FIG. 11

PATTERN OF NORMAL OPERATION

FIG. 12

PATTERN OF ABNORMAL OPERATION

FIG. 13

PATTERN OF ABNORMAL OPERATION

FIG.14

METHOD FOR RECOGNITION OF ABNORMAL CONDITIONS USING NEURAL NETWORKS

This is a continuation-in-part of U.S. Ser. No. 652,817, filed Feb. 18, 1991, now abandoned.

FIELD OF THE INVENTION AND RELATED ART STATEMENT

This invention relates to a method for recognition of normal and abnormal conditions in dynamic processes.

In a conventional expert system for a diagnosis of abnormal conditions in a dynamic process system, generally a deviation from a threshold limit value, which is set adjacent to a stationary-value, is recognized as an abnormal condition. Accordingly, the expert system can be applied only to supporting operations and recognition of abnormal conditions under steady-state operations. However, there are several modes of operations; not only steady-state operations but also unsteady-state operations such as start-up and shut-down operations. Then, it is necessary to support the unsteady-state operations, recognitions of abnormal conditions under the even unsteady-state operations are required.

In prior art, Japanese Patent Open Application Laid-Open No. 1-210840 shows an expert system for a diagnoses of abnormal conditions of diesel engines. The fundamental method of this system exists in pattern-matching between standard patterns and actual patterns. By applying the method shown in this patent application, the abnormal conditions under the unsteady-state operations can be recognized. In this case, first, sets of trend data showing abnormal conditions of an object system are stored as the standard patterns. Next, the actual trend data showing operational conditions during a predetermined period are taken in so as to form the actual patterns. Then, the standard patterns and the actual patterns are compared. Finally, when the actual patterns match the standard patterns, the operational conditions can be determined to be abnormal.

This method can be sufficiently applied to an object system where predetermined patterns are repeated, as shown in an engine-operation. However, for another object system which does not always show predetermined patterns, many kinds of standard patterns must be stored corresponding to the sets of trend data showing the abnormal conditions of such an object system. Since the actual patterns are generally very complicated in such an object system, the standard patterns also must be complicated. Further, when the actual patterns are too complicated, miss-recognition by operators of the system often occur (i.e., operator misreading data or incorrectly operating a valve, etc.). Accordingly, since too large an amount of effort must be taken to prepare the standard patterns in some object systems, it is substantially impossible to recognize the abnormal conditions.

Another problem is as follows; in this method, in order to recognize the abnormal conditions precisely, interpretation must be carried out after enough data have been matched to one of the standard patterns. Therefore, although the abnormal conditions actually happen in the system, they cannot be recognized in real time.

In other words, under both steady-state operations and unsteady-state operations, more flexible methods of real time recognition of the normal and abnormal conditions are desired.

OBJECT AND SUMMARY OF THE INVENTION

It is therefore the object of the present invention to provide a method in real-time by which normal and abnormal conditions of an object system, having operators which perform manual functions of the object system, can be recognized in both steady-state operations and unsteady-state operations in real time and by which a standard criterion can be formed easily. In other words, the object system of the present invention includes human operators of the object system. The operators are necessary to perform manual procedures for the object system to function (i.e., the human operators become a part of the object system).

According to the present invention, a method for recognition of normal and abnormal conditions can be performed with at least one neural network. First, trend data of an object system before a recognition-step are entered as input data to an input layer of each neural network. The input data includes data generated by the operators performing their tasks and may include human errors due to mistakes which does not effect the normal conditions of the object system. The input data may be real time data. Data of this system at the recognition-step are entered as objective output data to an output layer of the neural network. Thus, multiple sets of trend data showing at least one normal condition of this system are formed in the neural network in order to obtain learned weights and biases (note, the normal conditions may include the mistakes generated by the operators of the object system). Thus, the neural network learns based on normal conditions of the object system. Next, output data at every recognition-step are predicted by entering actual trend data as input data to the neural network, while the learned weights and biases are utilized. Then, the predicted output data are compared with actual output data at every recognition-step. Finally, the normal and abnormal conditions of this system can be recognized by real time interpretation of deviations between the predicted output data and the actual output data. That is, unknown patterns in the output data, which are different from the trend patterns of the normal conditions, are recognized in the present invention as an abnormal condition while trend patterns that follow the normal condition are recognized as a normal condition.

The neural network in this specification means a multi-layered artificial neural network technique having a forwarded chaining. Preferably, each neural network comprises more than two and less than ten layers, more preferably, more than three and less than five layers. Each set of data comprises predetermined causes and effects. Then, this technique exists in a process system where non-linear multi-dimensional parameter turning can be processed while every set of data always satisfies the predetermined relation of the causes and the effects.

In the art of the present invention, the parameter tuning is called learning. As a parameter tuning method, a Back Propagation Method is generally used.

The multiple sets of trend data showing at least one normal condition are used as the data for the learning. In this case, the multiple sets of trend data showing multiple normal conditions can be used efficiently. Thus, in each neural network, the multiple normal conditions such as start-up, shut-down and the like can be treated at the same time. In each recognition-step, the trend data of the object system before the recognition-step are entered as input data to the neural network. On the other hand, the data at the recognition-step are entered as objective output data of the neural network. Through optimization of the neural network, the output data, which are predicted by entering the trend data before the recognition-step, can gradually converge to the objective output data at the recognition-step. In this case, a bias of each node and a weight of each arrow between each pair of nodes are used as optimization parameters.

Thus, with the neural network, during the optimization process, normal conditions of the object system are learned. When this learning is repeated to some degree, by entering the trend data of the object system before the recognition-step as the input data, the predicted output data under the normal conditions can be converged to a value with a predetermined deviation range from the objective output data at each recognition-step. Therefore, a non-linear model of the normal characteristics of the object system can be provided in this neural network.

Next, after the above mentioned learning is finished, the actual trend data of the object system in real-time are entered as input data to the neural network. Thus, output data at each recognition-step can be predicted by the neural network in real-time. Then, this predicted output data are compared with the actual output data at each recognition-step in real time. If they are not the same, a difference; the deviation, is produced between this predicted output data and the actual output data at the recognition-step. As explained before, in the neural network, the optimization is carried out so that the actual output data under the normal conditions can be converged to the value with the predetermined deviation range. Accordingly, by interpretation of the deviation, conditions of the object system can be recognized to be normal or abnormal. For example, when the deviation is in the predetermined deviation range, the conditions of the object system can be determined to be normal. On the other hand, when the deviation violates the deviation range, the conditions of the object system can be determined to be abnormal.

In the present invention, according to the above theory, the normal and abnormal conditions can be recognized in real-time by utilizing a result of the learning in the neural network as a criterion. In order to specify this criterion, the sets of trend data of the object system showing at least one normal condition are entered as the input data to the neural network. By just this simple operation, the criterion and dynamics of the whole of object system are automatically generated in the neural network. In the prior art, in order to specify the criterion, very complicated operations are required, because the patterns of data of the object system showing abnormal conditions are very complicated. However, in the present invention, even if the object system has any complicated dynamics characteristics, the recognition can be performed freely due to this simple operation.

Further, the recognition is performed while the trend data have an allowance as the above mentioned deviation range. Therefore, both of the abnormal and normal conditions of the object system can be recognized precisely in real time.

As a result, the method for recognition of normal and abnormal conditions in the present invention can be applied with large effect to particularly, a control system having operators requiring the recognition of abnormal conditions in real-time such as the control system for the operation of a plant (example, chemical or nuclear plants), an automobile, a robot, an aircraft, a marine vessel, a medical apparatus, security apparatus and the like.

Further objects and advantages of the present invention will be apparent from the following description, reference being had to the accompanying drawing wherein preferred embodiments of the present invention are clearly shown.

DETAILED DESCRIPTION OF THE PREFERRED EMBODIMENT

Now, embodiments of the present invention will be explained referring to the drawings.

Figure 1:
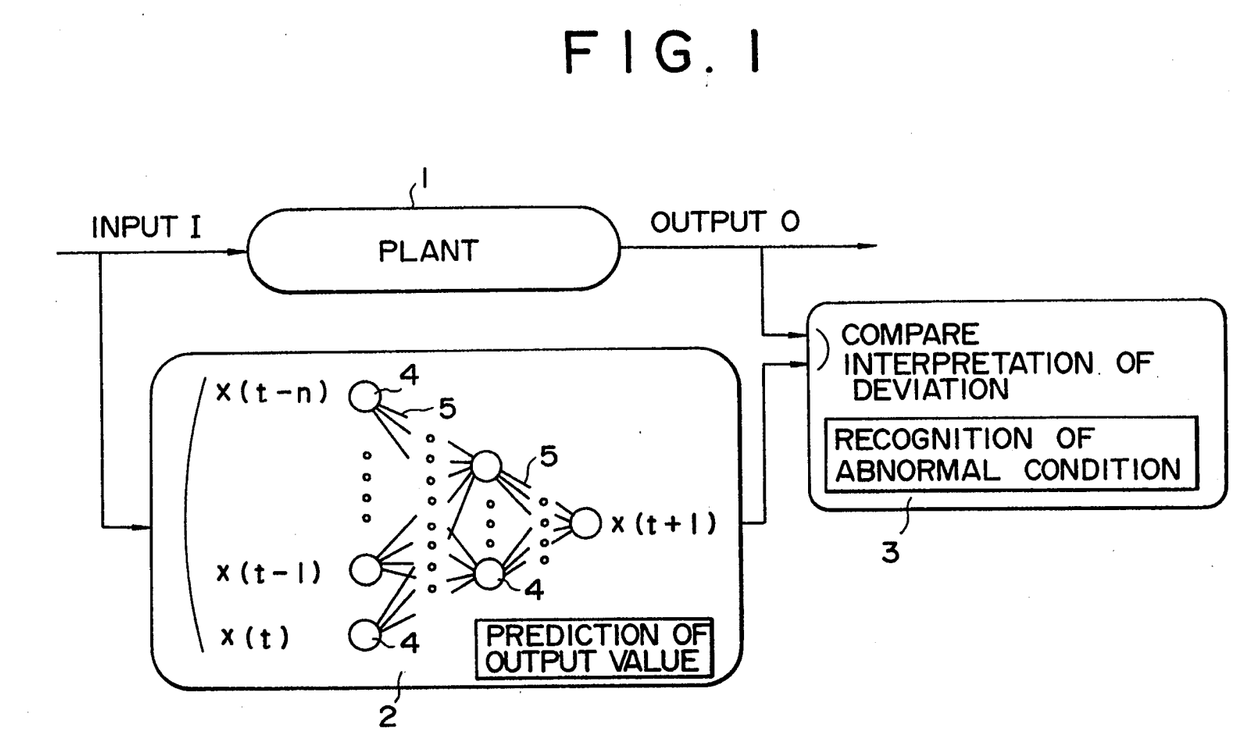
FIG. 1 is a block diagram showing schematically a system structure of an embodiment where the method of the present invention is applied to the recognition of normal and abnormal conditions in a plant-operation.

FIG. 1 shows schematically a system structure of an embodiment of the present invention applied to recognition of abnormal conditions in real-time for a plant-operation having human operators which must perform manual operations.

A plant 1 is an object system. The object includes the mechanical devices of the plant as well as the human operators. Then, a recognition system of this embodiment comprises, a neural network 2 and a compare and interpretation section 3. Further, for example, the plant 1 comprises process equipment and a control system for a plant operation including operators that control some or all of the manual functions, such as the operation of values, etc., at predetermined operation points. Input plant data I (including the operator actions whether or not the actions are correct or in error) are entered as input data, and output plant data O are generated as output data from the plant 1. The input plant data I is also input to the neural network 2 as trend data. Each set of trend data among the input plant data I comprises data, preferably at less than ten steps, more preferably, at less than five steps including a recognition-step and steps before the recognition-step respectively. For example, data among the input plant data I at five steps including a present step and four steps before the present step; $x(t)$, $x(t-1)$, ..., $x(t-4)$ are entered as the input data thereby predicated output data predicting the output plant data O at a next step; i.e., predicted output data $x(t+1)$ can be predicted. An actual output data O from the plant and the predicted output data $x(t+1)$ are entered to the compare and interpretation section 3. In this interpretation section 3, a difference between the actual output data O and the predicted output data $x(t+1)$ is determined and a deviation can be interpreted as whether the conditions of the system are abnormal or normal.

Figure 4:
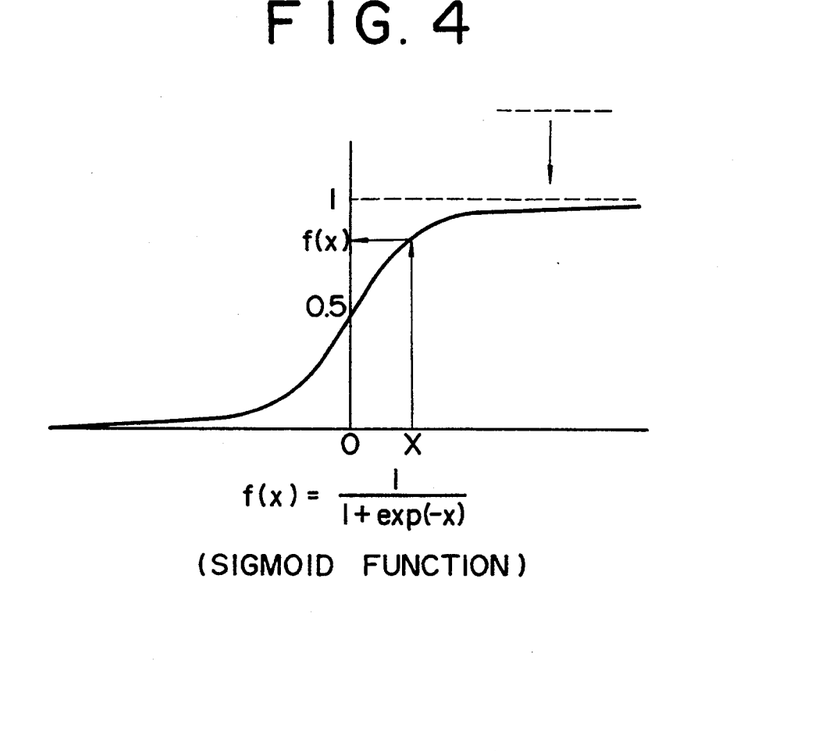
FIG. 4 is a graph showing a Sigmoid Function.

Nodes 4, 4, ... and arrows 5, 5, ..., which are connected between nodes 4, 4, ... are provided in the neural network 2. Each arrow 5 has a weight w. Each node 4 has a bias b. Then, in each node 4, a calculation is performed by means of, for example, a Sigmoid Function $f(x)$ (see FIG. 4) thereby a result of the calculation can be entered as the above mentioned predicted output data $x(t+1)$.

Figure 3:
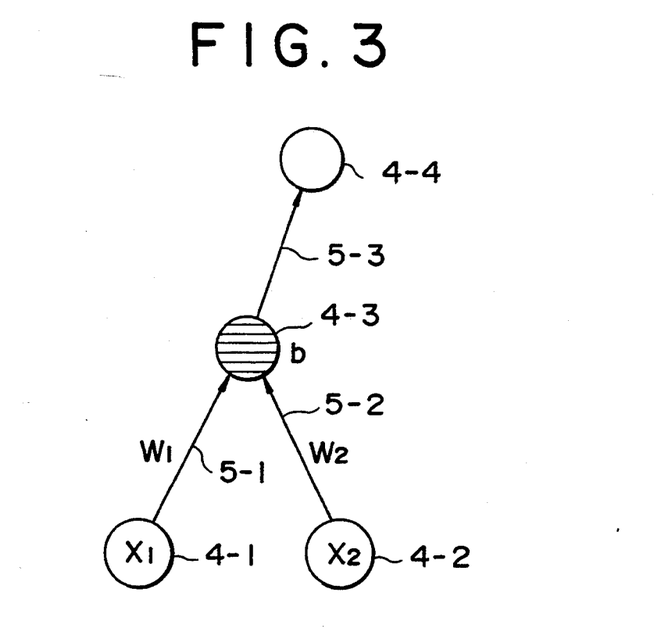
FIG. 3 is an illustration showing a structure of a neural network.

For example, in a neural network shown in FIG. 3, an explanation will be carried output for a node 4-3. Data x1 obtained by a node 4-1 and data x2 obtained by a node 4-2 are entered as input data to the node 4-3. An arrow 5-1 is connected between the node 4-1 and the node 4-3. On the other hand, an arrow 5-2 is connected between the node 4-2 and the node 4-3. The arrows 5-1 and 5-2 have weights w1 and w2 respectively. Data x1*w1 obtained from the data x1 by the node 4-1 are entered through the arrow 5-1 to the node 4-3 as input data. Also, data x2*w2 obtained from the data x2 by the node 4-2 are entered through the arrow 5-2 to the node 4-3 as input data. In the node 4-3, for the above mentioned function $f(x)$, a following calculation is performed:

$$f(x) = f(x1*w1 + x2*w2 + b)$$
$$= 1/\{1 + \exp[-(x1*w1 + x2*w2 + b)]\}$$

The above mentioned predicted output data $x(t+1)$ can be obtained by such calculations with the nodes 4, 4, ..., respectively.

Figure 2:
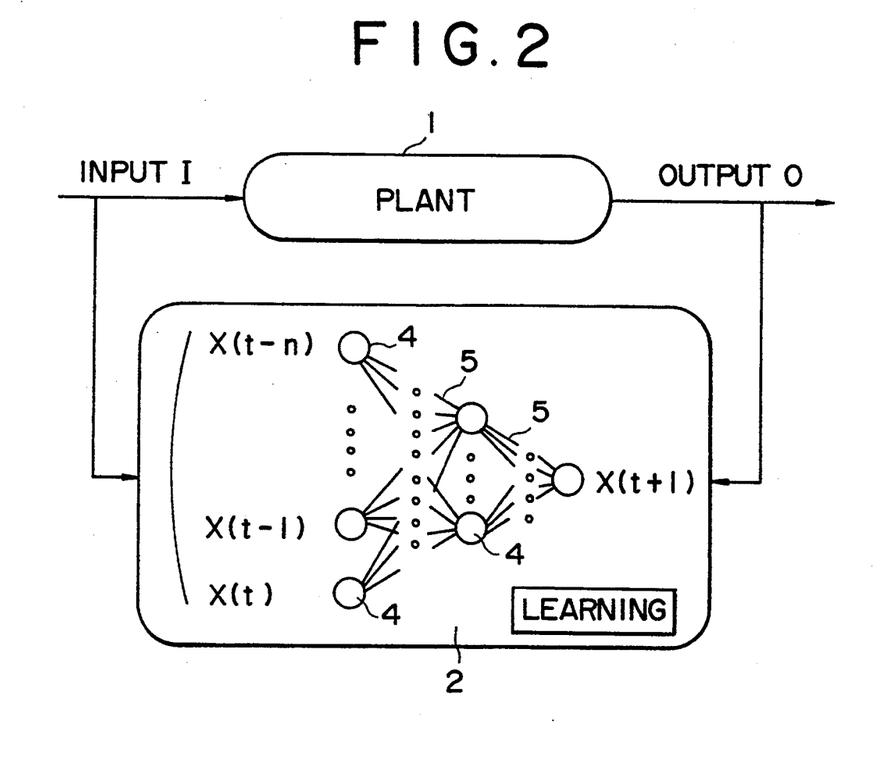
FIG. 2 is a block diagram showing schematically a system structure in the embodiment of FIG. 1 when learning is performed in a neural network.

FIG. 2 shows a system structure of the neural network 2 in a learning state (phase). In the neural network 2, while learning calculations can be carried out, a pattern of trend data under the normal conditions of the plant 1 can be learned. As noted before, the normal conditions may include operator mistakes. At the same time, a learning error can be provided in this recognition system. Here, it is assumed that data among the input plant data I at five steps including the present step and four steps before the present step; $x(t)$, $x(t-1)$, ..., $x(t-4)$ are entered as the input data thereby the data predicting the output plant data O at the next step; $x(t+1)$ can be predicted.

The trend data among the input plant data I under the normal conditions of the plant 1 at five steps including the present step and four steps before the present step; $x(t)$, $x(t-1)$, ..., $x(t-4)$ are entered as the input data and the predicted output data among the output plant data O at the next step; $x(t+1)$ are entered as objective output data. Then, the above mentioned relationship between the input data and the objective output data is learned for the normal (operating) conditions with the neural network 2. The learning error is a difference between the actual output data and the objective output data under the normal conditions.

The trend data as the input data (causes) among the input data I and the objective output data (effects) among the output plant data O are entered to the neural network 2 respectively. Thus, each set of output data can be predicted from each set of input data. Next, the bias b of each node 4 and the weight w of each arrow 5 are changed so that the difference between the predicted output data and the objective output data is minimized. The learning in the neural network 2 means this changing process of the parameters b and w. This learning is also called parameter tuning. The learning calculation is performed according to a predetermined learning method such as a Back Propagation Method.

Each set of data comprises the trend data among the input plant data I at five steps including the present step and four steps before the present step; $x(t)$, $x(t-1)$, ..., $x(t-4)$ and the objective output data among the output plant data O (data at the next step; $(t+1)$). Then, the above-mentioned learning calculation is repeatedly performed for every set of data. Accordingly, the learning is performed sufficiently. Thus, corresponding to the trend data at any steps; $x(t)$, $x(t-1)$, ..., $x(t-4)$, output data at the next step; $x(t+1)$ can be predicted. This predicted output data is converged to a value with a predetermined deviation range from the objective output data. Thereby, the bias b of each node 4 and the weight w of each arrow 5 can be optimized.

Next, trend data $x(t)$, $x(t-1)$, ..., $x(t-4)$ are entered to the neural network 2 as input data. Therefore, output data at the next step $(t+1)$ can be predicted.

Figure 14:
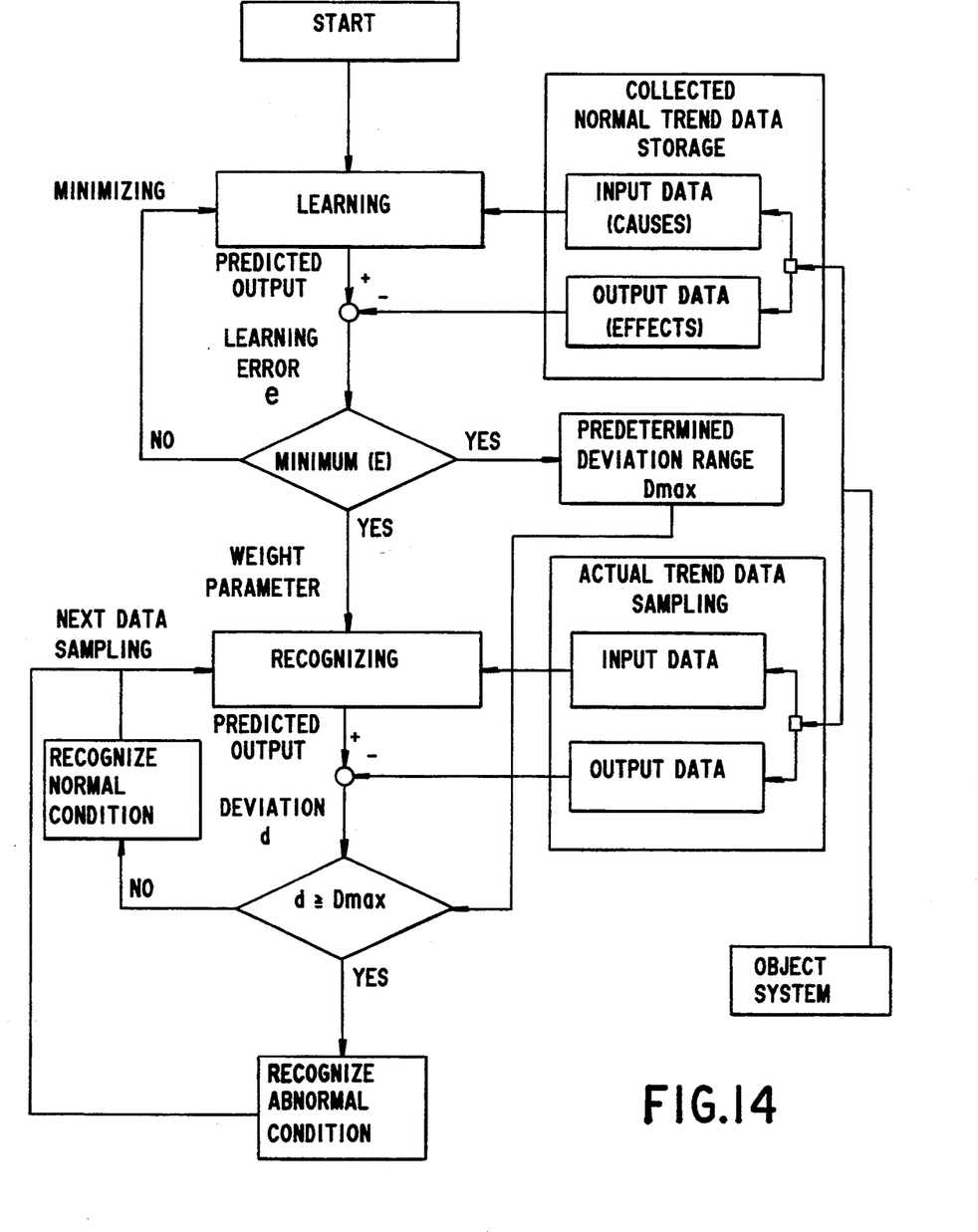
FIG. 14 is a flow chart of the learning and recognition steps of the present invention.

Continuously, at the compare and interpretation section 3 of FIG. 1, as explained before, the deviation, which is the difference between the actual output data among the output plant data O at the step $(t+1)$ and the predicted output data $x(t+1)$, can be interpreted. When this deviation is in the predetermined deviation range, the conditions of this object system can be determined to be normal. On the other hand, when this deviation violates the predetermined deviation range, the conditions of this system can be determined to be abnormal (See FIG. 14 for flow chart of the present invention). Now, two methods of this recognition will be explained.

Figure 5:
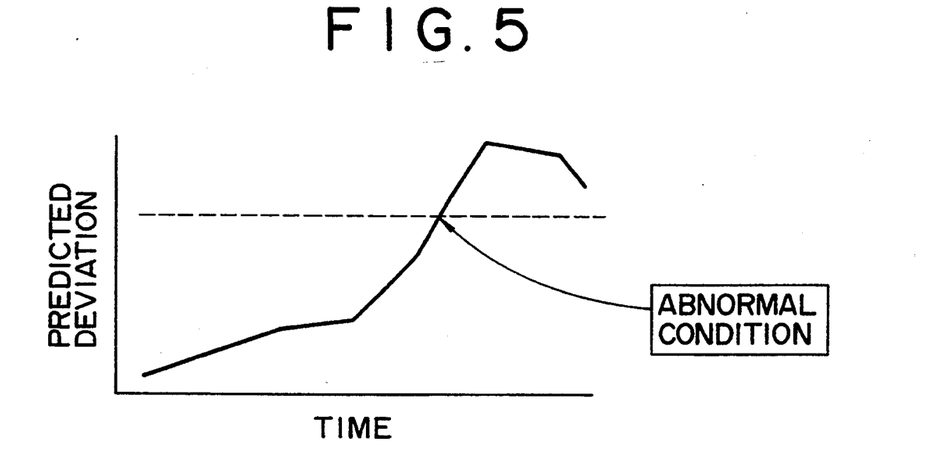
FIG. 5 is a curve diagram showing a relationship between deviation and a threshold limit value in an interpretation method at a compare and interpretation section of FIG. 1.

One method is that the deviation is compared with a threshold limit value determined by a maximum learning error. As show in FIG. 5, when this deviation exceeds the threshold limit value, the conditions of this system can be determined to be abnormal. In this figure, a continuous line shows the deviation while a broken line shows the threshold limit value.

This method is suitable for a case where the value of the deviation is changed suddenly and vigorously.

Figure 6:
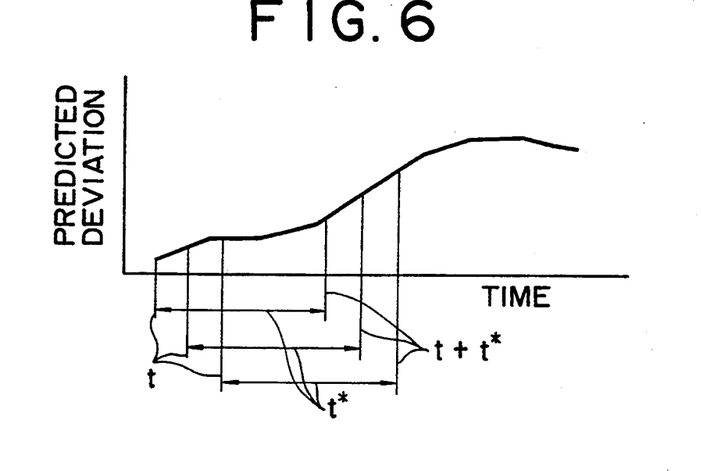
FIG. 6 is a curve diagram showing an integral time for deviation in another interpretation method at the compare and interpretation section of FIG. 1.
Figure 7:
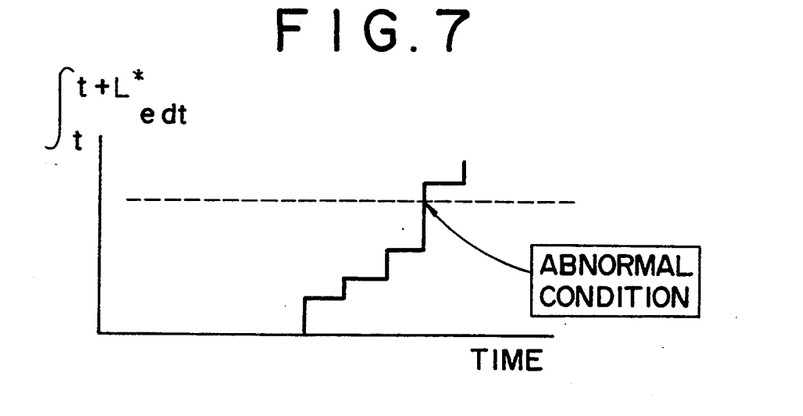
FIG. 7 is a curve diagram showing a relationship between an integrated value of deviation and a threshold limit value in the interpretation method of FIG. 6.

Another method is as follows; When a summation of the deviation at several steps is larger than a predetermined value, the conditions of this system can be determined to be abnormal. That is to say, as shown in FIG. 6, an integrated value of the deviation during every predetermined internal time (t*) is compared with a threshold limit value determined by a maximum integrated learning error during a predetermined and constant integral time. Then, when this integrated value is larger than the threshold limit value, the conditions of this system can be determined to be abnormal.

In this method, abnormal conditions mean that the deviation is slightly smaller than the threshold limit value and these conditions are kept for a certain period of time.

The integral time of this method can be decided by training the neural network to become a skeleton network.

This skeleton network is the network where learning is performed so that this network has the smallest number of arrows, i.e., the smallest redundancy. The objective function of this skeleton network can be stated with an equation explained hereafter. In this equation, an additional term, named the distribution factor, that expresses the complexity of connections in the network is added to a square deviation term in the Back Propagation Method. This learning minimizes the distribution of connections expressed by the additional term (a distribution coefficient c becomes smaller, i.e., as the relation of the data on the output node decreases, the value c increases) in optimization. Thus, weak connections are eliminated while only stronger connections remain (i.e., data unrelated to determining the output (weak connections) are not used to determine the output so that only some of the connection structure of the neural network is used and some are not used, i.e., a skeleton network is formed). The objective E is described as follows:

$$\Sigma = \text{(summation of square deviation)} + \text{(distribution factor)}$$

$$= \sum_i (t_i - a_i)^2 + c \sum_j \left| \prod_k w_{jk} \right|$$

Each parameter in this equation is as follows:
$t_i$: target value of i the output node
$a_i$: activation value of i th output node
$w_{jk}$: value of connection weight from node k to node j
c: distribution coefficient (0-1)

Figure 8:
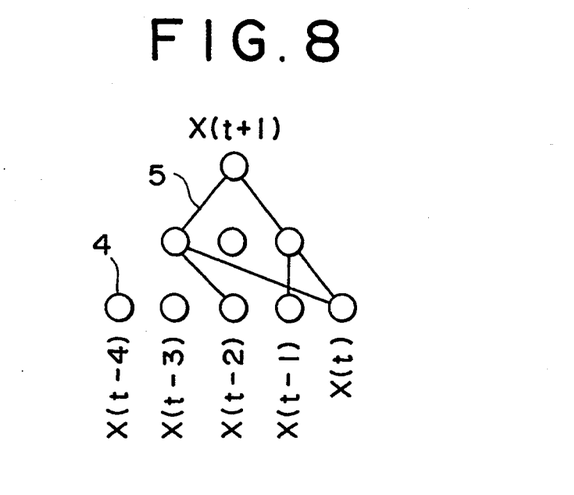
FIG. 8 is an illustration showing one example of a structure of a neural network trained so as to become a skeleton network.

For example, the neural network 2 is optimized so as to become the skeleton network having a connection-structure shown in FIG. 8. In an input layer, just three nodes, to which the data $x(t)$, $x(t-1)$, $x(t-2)$ are entered as the input data, are related to an output layer respectively. However, other two nodes, to which the data, $x(t-3)$, $x(t-4)$ are entered as the input data, are not related to the output layer. Therefore, it is clear that the predicted data $x(t+1)$ is not related to the data $x(t-3)$, $x(t-4)$. Thus, as the integral time, five steps; from t to $(t-4)$ are not required, but just three steps; from t to $(t-2)$ are required. Accordingly, the integral time can be determined to be from t to $(t-2)$.

An example will now be explained about how a system having the above mentioned neural structure is applied to a liquid level control system as an object system shown in FIG. 9.

Figure 9:
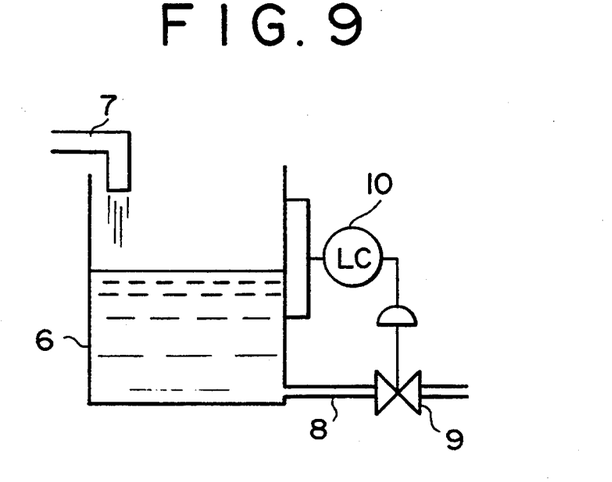
FIG. 9 is an illustration showing a structure of a liquid level control system applied to the present invention.

The system as the object system of FIG. 9 comprises a tank 6, a feed pipeline 7, an outlet pipeline 8, a flow control value 9 and a level controller 10. The operation of the valve 9 may be by a mechanical device (i.e., automatically) or by a human operator.

In this system, an initial liquid level is below a set-point of the level controller 10. Then, from a start of a simulation including operator input, a constant flow is fed into the tank 6. Since the valve 9 is closed, the liquid level is brought up at a constant rate before the liquid level reaches the set-point of the level controller 10. Then, at the set-point the input signal from the level controller 10 is turned positive. Thus, the valve 9 is opened so that the liquid level control is started in order to keep a constant liquid level.

Therefore, in this example, there are two modes; one mode is that the liquid level control is active and another mode is that the liquid level control is not active.

A learning in this control system associated with the liquid level control system is carried out as follows; the data $x(t)$, $x(t-1)$, ..., $x(t-4)$ for controlling the flow from the feed pipeline 7 are entered into the present invention neural structure of FIG. 1 as input data and the data about the liquid level are entered into the present invention neural structure of FIG. 1 as the objective output data $x(t+1)$. As the result of learning, the liquid level at the step $(t+1)$ is predicted in real-time by the present invention.

Figure 10:
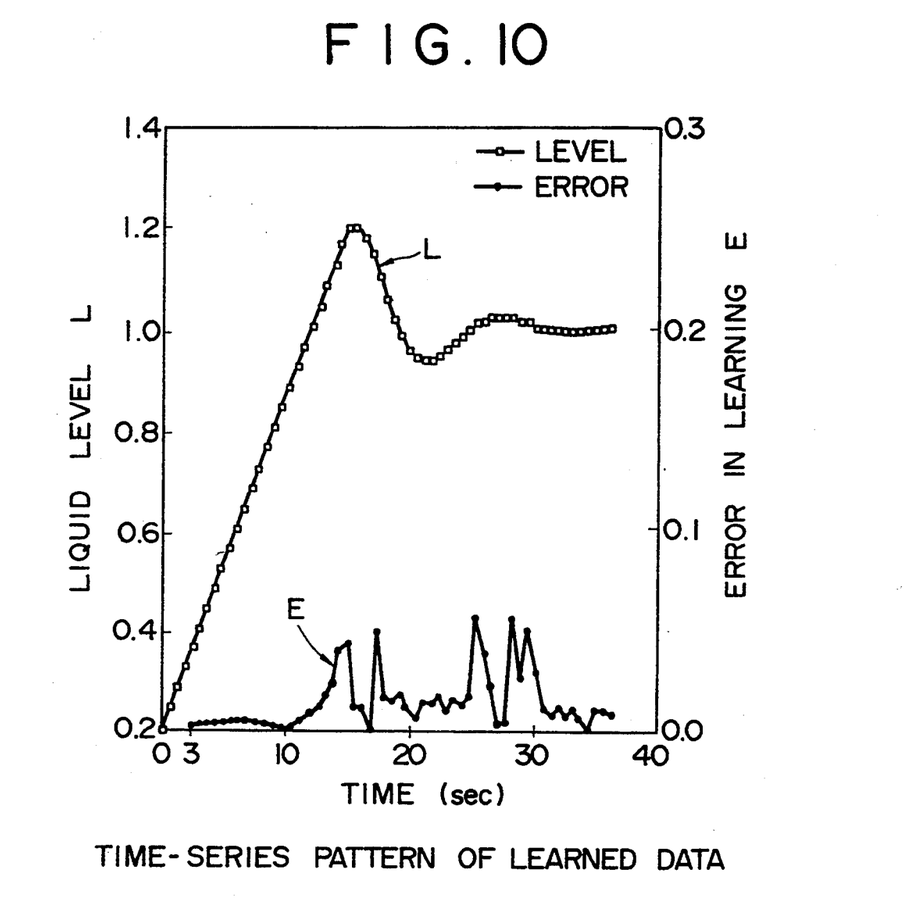
FIG. 10 is curve diagrams showing liquid level change and learning error obtained by learning with a neural network from an initial condition in the liquid level control system of FIG. 9.

FIG. 10 shows liquid level change and learning error obtained by learning with a neural network under the normal conditions from an initial condition in the liquid level control system of FIG. 9. In this figure, L shows the liquid level change under the normal conditions while E shows the learning error obtained at the same plot-points as the plot-points under normal conditions.

For example, based on the result of learning, one threshold limit value is determined to be "0.1" by maximum learning error, while another threshold limit value is determined to be "0.2" by maximum integrated learning error during the integral time; three steps from t to $(t-2)$.

Figure 11:
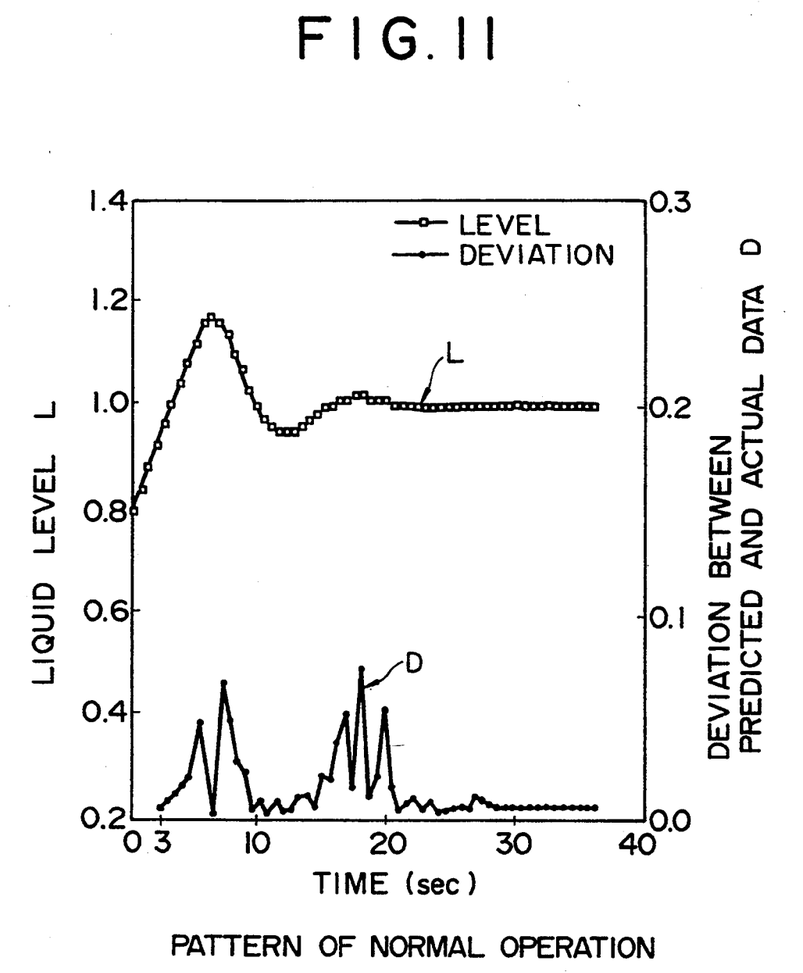
FIG. 11 are curve diagrams showing liquid level change and deviation between predicted liquid level in the neural network and actual liquid level on the same conditions as the conditions of the learned case of FIG. 10 with only difference of initial liquid level.

FIG. 11 shows liquid level change and deviation between the predicted liquid level from the neural net and actual liquid level based on the same conditions as the conditions occurring during the learning of FIG. 10 with the only difference being an initial liquid level.

The deviation shown in FIG. 11 is not very different from the learning error shown in FIG. 10. Both the deviation and the integrated value of the deviation are in normal ranges respectively. Accordingly, the conditions of the liquid level change can be recognized to be normal.

Figure 12:
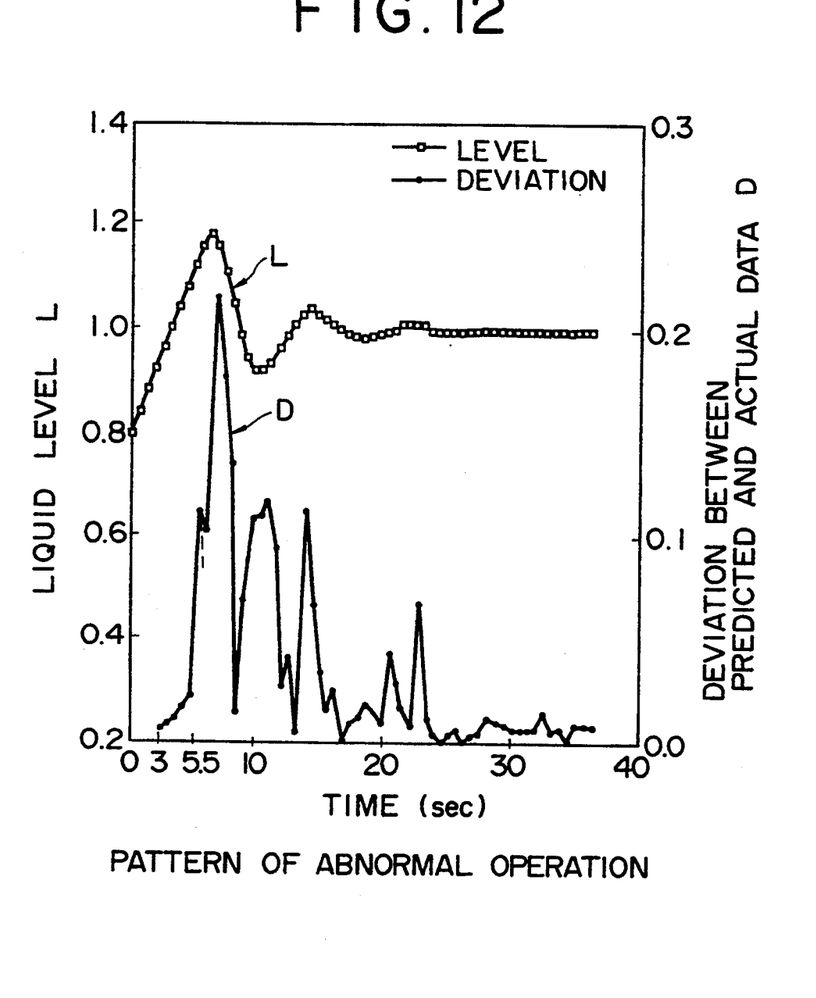
FIG. 12 are curve diagrams showing liquid level change and deviation between predicted liquid level in a neural network and actual liquid level in case that an integral time of the liquid level controller is changed due to abnormal conditions in the liquid level control system of FIG. 9.

FIG. 12 shows liquid level change and deviation between predicted data and actual output data in the neural network when the integral time of the liquid level controller is changed due to abnormal conditions in the liquid level control system.

In this case, the deviation at each step in the liquid level change seem to be normal. However, since the integral time is changed abnormally, the liquid level change becomes abnormal. Accordingly, the abnormal conditions can be recognized by the present invention due to the deviation. This deviation of FIG. 12 is larger than the learning error of FIG. 10. The deviation exceeds "0.1" after 5.5 seconds of operation from start-up. Therefore, the conditions of this object system can be recognized to be abnormal by the present invention.

Figure 13:
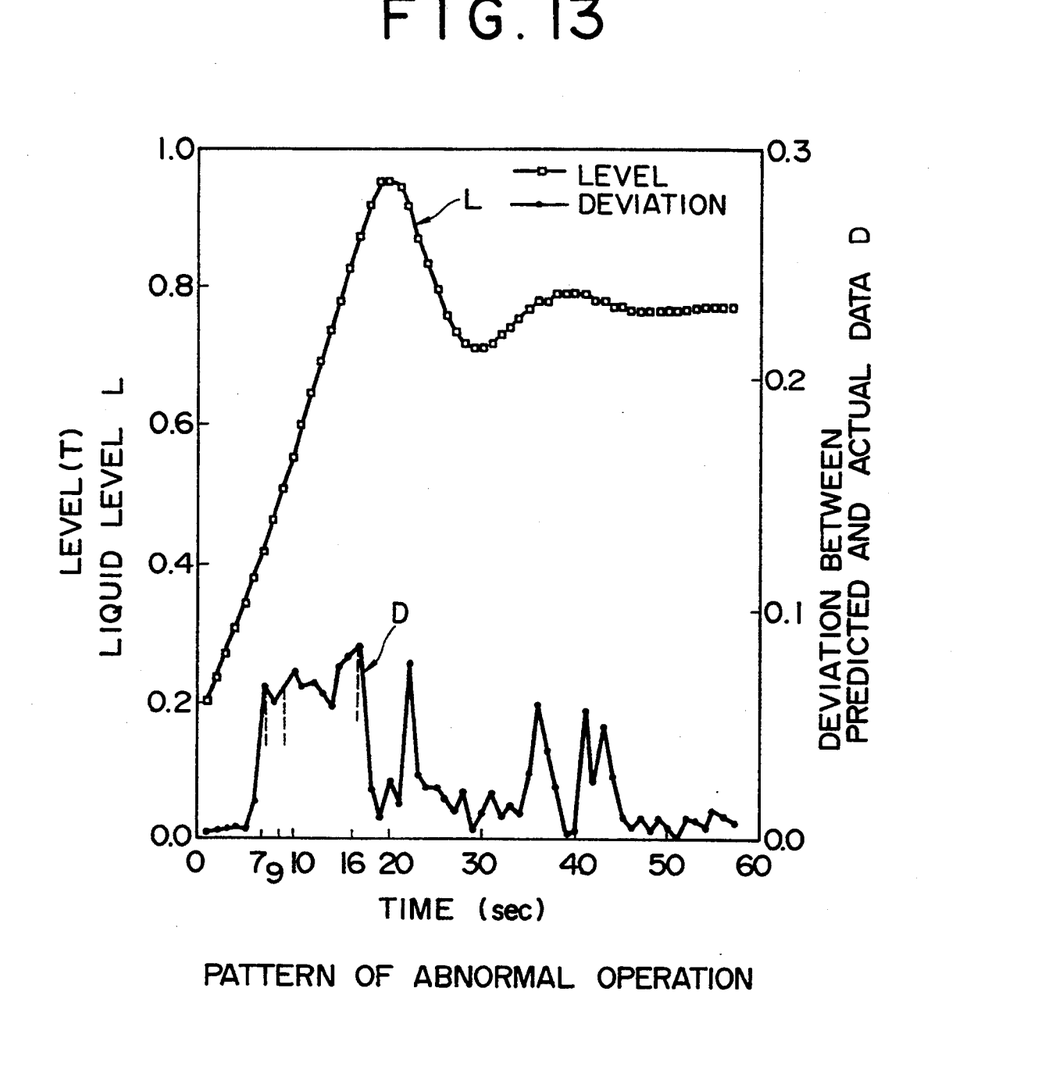
FIG. 13 are curve diagrams showing the liquid level change and deviation between predicted liquid level in a neural, network and actual liquid level in case that liquid feed is abnormally increased 25% of the liquid feed of the normal conditions after 5 seconds of operation from a start-up in the liquid level control system of FIG. 9.

FIG. 13 shows liquid level change and deviation between predicted data and actual output data in the neural network when liquid feed is abnormally increased 25% of the normal conditions after 5 seconds of operation from start-up. In this case, although the deviation does not exceed "0.1" it is converged to "0.1" after 7 seconds of operation from start-up and this condition is kept for 9 seconds. An integrated value of the predicted data during the integral time; three steps during t to (t−2) exceeds "0.2" after 9 seconds of operation from start-up. Therefore, this condition of the object system can be recognized to be abnormal from this time.

As explained above, in the neural network, the learning is performed so that the trend data satisfy the predetermined relationship between the causes and effects under the normal conditions of the liquid level control system. Then, a model of the data satisfying the same relationship is formed in the neural network. Therefore, the normal and abnormal conditions can be recognized while the model is utilized as the criterion.

In the above mentioned examples, the method of the present invention is applied to the liquid level control system for the plant-operation. However, it is apparent that the present invention is not limited to these specific embodiments. In particular, the object system of the present invention includes an object system which is not fully automated and which requires some human interaction with the mechanical devices of the object system. Thus, the human operators become part of the object system. The present invention is "trained" using normal conditions. However, due to the human operators, the normal conditions may include mistakes or errors due to the operator's mistakes. Once the neural network of the present invention is trained, the neural network can recognize normal trend patterns of the data and unknown patterns of the data. The unknown patterns are recognized as an abnormal condition. The present invention is thus able to recognize abnormal activity within an object system as well as an emergency situation (i.e., extreme abnormal condition).

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

We claim:

1. A method of recognizing normal and abnormal conditions in real time of an object system and outputting the recognition, said object system having at least one neural network, said object system including at least one human operator providing input thereto, input data for said object system including input from said at least one human operator, said method comprising the steps of:

setting bias and weight for each node of the neural network;

inputting a plurality of sets of dynamic input trend data indicating normal operating conditions of said object system into said neural network, said normal operating conditions including operator errors;

determining a plurality of sets of predicted output data based upon a sigmoid function of said plurality of sets of input data and said biases and weights;

inputting a plurality of sets of output data indicating normal output results of said object system into said neural network;

determining a difference between each set of predicted output data and each corresponding set of output data which indicates normal results;

minimizing differences between input data and output data by changing the bias and weight for each node of the neural network;

determining a deviation range for predicted output data based on the minimized differences;

inputting past trend data into said neural network and into said object system;

determining predicted output data from said neural network based on said bias and weight from each node;

determining real-time actual output data from said object system;

comparing differences between actual output data from said object system and predicted output data from said neural network;

determining if the difference is within said deviation range indicating a normal real-time condition;

determining if the difference is outside said deviation range indicating an abnormal real-time condition; and outputting a warning when said abnormal real-time condition exists in said object system based upon said determination of normal and abnormal real-time conditions.

2. The method for recognition of normal and abnormal conditions according to claim 1, wherein said steps of inputting said plurality of sets of input and output data input to said neural network include a step of inputting data having multiple normal conditions.

3. The method for recognition of normal and abnormal conditions according to claim 1, further comprising the step of optimizing said neural network to become a skeleton network based on said weights and biases.

4. The method for recognition of normal and abnormal conditions according to claim 1, wherein said determination of said deviation range is performed by comparing said deviation with a threshold limit value determined by a maximum learning error.

5. The method for recognition of normal and abnormal conditions according to claim 1, wherein said determination of said deviation range is performed by comparing an integrated value of said deviation with a threshold limit value determined by a maximum integrated learning error during predetermined and constant integral time.

6. The method for recognition of normal and abnormal conditions according to claim 1, further comprising the step of using, as said object system, a control system for a plant-operation.

7. The method for recognition of normal and abnormal conditions according to claim 1, wherein said step of determining if the difference is outside said deviation range includes a step of operating said object system under unsteady-state operations.

8. The method for recognition of normal and abnormal conditions according to claim 1, wherein said neural network comprises more than two and less than ten layers.

9. The method for recognition of normal and abnormal conditions according to claim 1, wherein said neural network comprises more than three and less than five layers.

10. The method for recognition of normal and abnormal conditions according to claim 1, wherein said step of inputting a plurality of sets of input data include a step of inputting each set of input data comprising data at less than ten intervals including a recognition step and intervals before said recognition-step.

11. The method for recognition of normal and abnormal conditions according to claim 1, wherein said step of inputting the plurality of sets of input data include a step of inputting each set of input data comprising data at less than five intervals including a recognition-step and intervals before said recognition-step.

12. The method for recognition of normal and abnormal conditions according to claim 1 wherein said step of determining if the abnormal condition exists includes a step of detecting abnormal conditions caused by operator errors.

* * * * *